United States Patent
Berg et al.

(10) Patent No.: US 9,547,338 B2
(45) Date of Patent: Jan. 17, 2017

(54) ELECTRONIC DEVICE WITH INJECTION MOLDED DISPLAY TRIM

(71) Applicant: Apple Inc., Cupertino, CA (US)

(72) Inventors: Bruce E. Berg, Santa Clara, CA (US); Bryan W. Posner, La Selva Beach, CA (US); Dinesh C. Mathew, Fremont, CA (US); Robert Y. Cao, San Francisco, CA (US)

(73) Assignee: Apple, Inc., Cupertino, CA (US)

( * ) Notice: Subject to any disclaimer, the term of this patent is extended or adjusted under 35 U.S.C. 154(b) by 493 days.

(21) Appl. No.: 13/967,595

(22) Filed: Aug. 15, 2013

(65) Prior Publication Data

US 2015/0049433 A1 Feb. 19, 2015

(51) Int. Cl.
*G06F 1/16* (2006.01)
*B29C 45/14* (2006.01)
(Continued)

(52) U.S. Cl.
CPC ............. *G06F 1/1637* (2013.01); *B29C 45/14* (2013.01); *B29C 45/14336* (2013.01);
(Continued)

(58) Field of Classification Search
CPC .... G06F 1/1616; G06F 1/1656; G06F 1/1658; G06F 1/1637; G06F 1/1613; G06F 1/1662; G06F 2200/1612; G06F 1/16; G06F 1/1647; G06F 1/181; G06F 1/203; G06F 1/1633; B29C 45/14; B29C 45/14336; B29C 2045/14868; B29C 45/14311; B29C 45/14778; B29C 45/14467; B29C 45/14065; B29C 45/14639; B29C 45/1671; B29C 66/71; B29C 45/0001; B29C 45/14786; B29C 45/14811; B29C 45/1418; B29C 45/14475; B29C 45/14631; B29C 45/14836; B29C 43/003; B29C 43/18; B29C 45/0053; B29C 45/14008; B29C 45/14073; B29C 45/14508; B29C 45/14549; B29C 45/14598; B29C 45/14795; B29C 45/14819; B29C 45/16; B29C 45/0062; B29C 45/02; B29C 45/03; B29C 45/14262; B29C 45/14377; B29C 45/14491; B29C 45/1459; B29C 45/14622; B29C 45/14688; B29C 45/14754; B29C 45/1679; B29C 45/1704; B29C 45/174; B29C 45/1742; B29C 45/1744; B29C 45/1769; H05K 7/02; H05K 1/02; H05K 1/0215; H05K 2201/0311; H05K 2201/2018; H05K 3/00; H05K 3/30; H05K 3/32; H05K 3/325; H05K 5/0004; H05K 5/0086; H05K 5/0217; H05K 5/03; B29D 99/006; B29L 2031/3481; B29K 2101/12
(Continued)

(56) References Cited

U.S. PATENT DOCUMENTS 6,474,995 B1    11/2002  Wu
7,569,171 B2    8/2009   Dieudonat et al.
(Continued)

FOREIGN PATENT DOCUMENTS

JP    2011093243    5/2011
WO    2012029347    3/2012

*Primary Examiner* — Anthony Haughton
*Assistant Examiner* — Ingrid Wright
(74) *Attorney, Agent, or Firm* — Treyz Law Group, P.C.; G. Victor Treyz; Kendall W. Abbasi

(57) ABSTRACT

An electronic device may be provided with a display. The electronic device may include a housing. A display trim may be formed from injection molded plastic that is molded directly onto the housing. The molded plastic trim may form a rectangular ring around the periphery of the housing. The housing may have angled or curved interior surfaces that are (Continued)

covered by the molded plastic trim. Computer-controlled positioners may be used to center the housing within an injection molding tool. Independently controlled positioners may also be used in capturing the housing between the lower die and the upper die in the injection molding tool. The injection molding tool may inject thermoplastic elastomer material into a channel in the upper die to form the plastic display trim.

19 Claims, 13 Drawing Sheets

(51) Int. Cl.
*B29D 99/00* (2010.01)
*G06F 1/18* (2006.01)
*B29K 101/12* (2006.01)
*B29L 31/34* (2006.01)

(52) U.S. Cl.
CPC ............ *B29D 99/006* (2013.01); *G06F 1/16* (2013.01); *G06F 1/181* (2013.01); *B29K 2101/12* (2013.01); *B29L 2031/3481* (2013.01)

(58) Field of Classification Search
USPC ............ 361/679.26, 679.09, 679.01, 679.02, 361/679.21, 679.27, 679.55–679.58; 455/575.1–575.4; 312/223.1–223.2; 264/238, 259, 271.1
See application file for complete search history.

(56) References Cited

U.S. PATENT DOCUMENTS

| | | | |
|---|---|---|---|
| 7,920,222 B2 | 4/2011 | Chen et al. | |
| 9,285,833 B2* | 3/2016 | Raff | G06F 1/1637 |
| 2009/0323262 A1* | 12/2009 | Arita | G06F 1/1616 |
| | | | 361/679.01 |
| 2010/0285260 A1 | 11/2010 | Bookbinder et al. | |
| 2011/0116220 A1 | 5/2011 | Lee | |
| 2012/0099251 A1 | 4/2012 | Cheon et al. | |
| 2013/0043054 A1 | 2/2013 | Ho | |

* cited by examiner

ELECTRONIC DEVICE WITH INJECTION MOLDED DISPLAY TRIM

BACKGROUND

This relates generally to electronic devices and, more particularly, to electronic devices with displays.

Electronic devices often include displays. For example, cellular telephones and portable computers include displays for presenting information to users.

An elastomeric trim may be used when mounting a display in an electronic device. The elastomeric trim may surround the periphery of the display and may prevent the display from becoming damaged by direct contact with the housing.

If care is not taken, the elastomeric trim may be larger than desired. This may make it difficult or impossible to reduce the border of the display as much as desired.

Challenges may also arise when assembling a piece of thin trim into a device, because it may be difficult to control the orientation of the trim with respect to the structures in the device.

It would therefore be desirable to be able to provide improved display trims for electronic devices with displays.

SUMMARY

An electronic device may be provided with a display. The electronic device may include a housing in which the display and other components are mounted. The housing may be formed from a material such as metal, plastic, glass, or fiber-based composites.

A display trim may be formed from injection molded plastic that is molded directly onto the housing. An injection molding tool may heat thermoplastic elastomer pellets sufficiently to melt the plastic. Molten plastic may be formed in a desired trim shape using a channel in a mold die.

The molded plastic trim may form a rectangular ring around the periphery of the housing. The housing may have angled or curved interior surfaces that are covered by the molded plastic trim.

Computer-controlled positioners may be used to center the housing within the injection molding tool. Independently controlled positioners may also be used in capturing the housing between the lower die and the upper die in the injection molding tool. The injection molding tool may inject molten thermoplastic elastomer material into a channel in the upper die to form the plastic display trim while the lower die and upper die are pressed against the housing.

DETAILED DESCRIPTION

Displays in electronic devices may be provided with trims. An elastomeric display trim may surround a display and prevent the display from becoming damaged by direct contact with a metal housing. For example, a display trim may prevent the display from becoming damaged by contact with a metal computing device housing or other electronic device housing structure. The display trim may be formed from plastic that is molded onto electronic device structures such as housing structures. By accurately placing the trim on the housing, tolerances may be improved, thereby allowing the size of the trim to be minimized. Difficulties that might otherwise arise when attaching a thin separate trim member to a housing can also be avoided, thereby simplifying assembly operations.

Figure 1A:
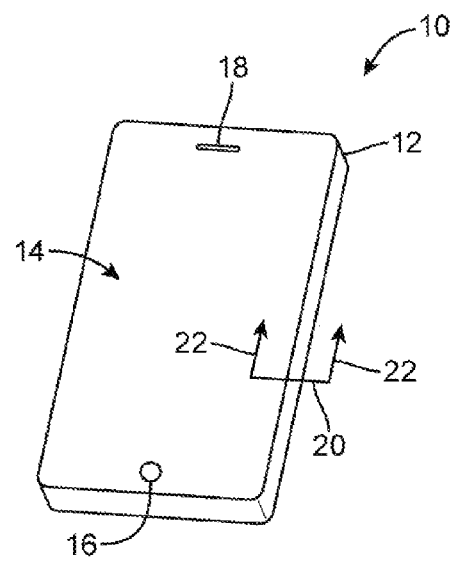
FIG. 1A is a perspective view of an illustrative electronic device such as a handheld computing device in accordance with an embodiment.
Figure 1B:
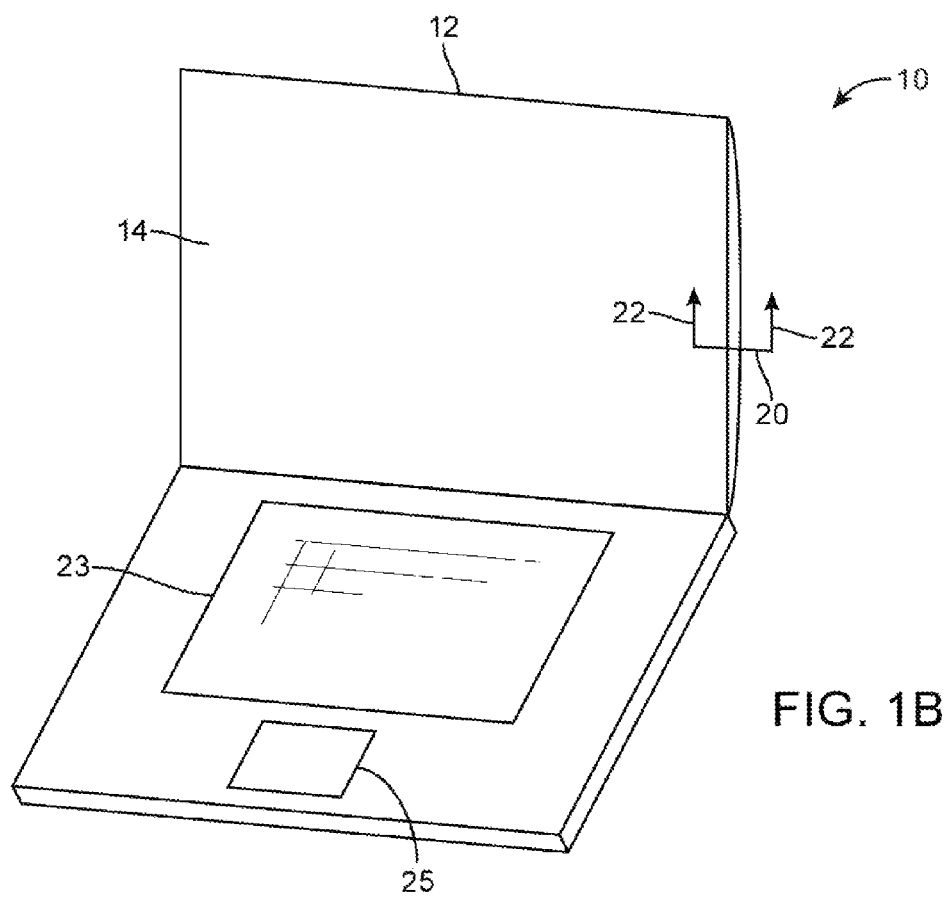
FIG. 1B is a perspective view of an illustrative electronic device such as a portable computer or other portable computing device with a display in accordance with an embodiment.

Illustrative electronic devices of the type that may be provided with a display and a trim for the display are shown in FIGS. 1A and 1B. An electronic device such as electronic device 10 of FIG. 1A or electronic device 10 of FIG. 1B may be computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1A, device 10 is a portable device such as a cellular telephone, media player, tablet computer, or other portable computing device. In the illustrative configuration of FIG. 1B, device 10 is a portable computing device such as a portable computer having an upper housing portion with a display and a housing that is attached to the upper housing by a hinge and that contains keyboard 23 and trackpad 25. Other configurations may be used for device 10 if desired. The examples of FIGS. 1A and 1B are merely illustrative.

Device 10 may have one or more displays such as display 14 mounted in housing structures such as housing 12. Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 includes display pixels formed from liquid crystal display (LCD) components or other suitable display pixel structures such as organic light-emitting diode display pixels, electrophoretic display pixels, plasma display pixels, etc.

A display cover layer may cover the surface of display 14 or a display layer such as a color filter layer (e.g., a layer formed from a clear substrate covered with patterned color filter elements) or other portion of a display may be used as the outermost (or nearly outermost) layer in display 14. The outermost display layer may be formed from a transparent glass sheet, a clear plastic layer, or other transparent member. If desired, openings may be formed in the outermost layer of display 14 to accommodate components such as button 16 and speaker port 18 of FIG. 1A (as examples). Buttons, connector ports, and other structures may also be accommodated using openings in housing 12.

The display cover layer and/or other layers in display 14 may sometimes be formed from materials such as glass, whereas housing 12 of device 10 may sometimes be formed from materials such as metal. To help prevent damage to display 14 that might otherwise arise due to direct contact between the glass or other materials in display 14 and the metal or other materials in housing 12, a plastic (polymer) trim may be interposed between the outer edge of display 14 (i.e., the rectangular periphery of display 14) and the opposing inner edge of housing 12. The trim may be formed from a plastic material that is softer than housing 12 (e.g., the trim may be formed from an elastomeric polymer). The trim may be molded onto housing 12 using injection molding (insert molding) techniques. The use of injection molding to form the trim may help in attaining tight tolerances and may simplify assembly. This may allow the size of the trim and therefore the width of the inactive border region in display 14 to be minimized, thereby enhancing device aesthetics.

Figure 2:
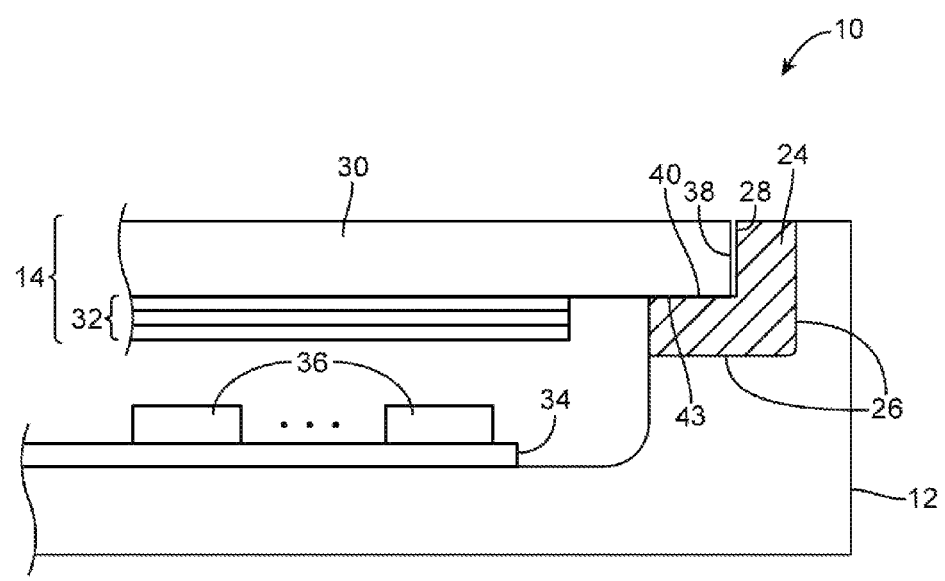
FIG. 2 is a cross-sectional side view of an illustrative electronic device with a display and display trim in accordance with an embodiment.

A cross-sectional side view of an illustrative electronic device such as device 10 of FIG. 1A or device 10 of FIG. 1B taken along line 20 of FIG. 1A or FIG. 1B and viewed in direction 22 of FIG. 1A or FIG. 1B is shown in FIG. 2. As shown in FIG. 2, display trim 24 may be molded onto inner surfaces 26 of housing 12 Inner surfaces 26 may form an inwardly facing peripheral ledge that runs around the periphery of housing 12. Display 14 may include outer display layer 30 and inner display layers 32. Display layers such as display layer 30 or other layers in display 14 may be supported by trim 24. In this arrangement, trim 24 may be interposed between the outer edge of display 14 and the opposing inner surface of housing 12 to help prevent damage to display 14.

Outer display layer 30 of display 14 may be a layer of clear glass or plastic. For example, display layer 30 may be a display cover glass layer or other display cover layer. Layers 32 may form a liquid crystal display, an organic light-emitting diode display, a plasma display, an electrophoretic display, or other display. For example, layers 32 may include liquid crystal display layers such as a layer of liquid crystal material interposed between a color filter layer and a thin-film transistor layer and sandwiched between opposing upper and lower polarizers. If desired, the color filter layer or thin-film transistor layer may be used in place of display cover layer 30. Configurations for display 14 in which display 14 has a display cover layer are sometimes described herein as an example.

Device 10 may include internal components 36 mounted on one or more substrates such as substrate 34. Internal components 36 may include integrated circuits, sensors, switches, connectors, and other electronic components. Substrate 34 may be a printed circuit board or other substrate. For example, substrate 34 may be a rigid printed circuit board formed from a material such as fiberglass-filled epoxy or may be a flexible printed circuit board such as a flex circuit formed from a sheet of polyimide or a layer of other flexible polymer.

Surfaces 26 in the example of FIG. 2 form an L-shaped ledge that supports molded trim 24. When display 14 is mounted in device 10, lower peripheral surface 40 of display cover layer 30 rests on surface 43 of trim 24 and outer edge surface 38 rests against surface 28 of trim 24. Other shapes and configurations for trim 24 and housing 12 may be used if desired. The illustrative configuration of FIG. 2 is merely illustrative.

Figure 3:
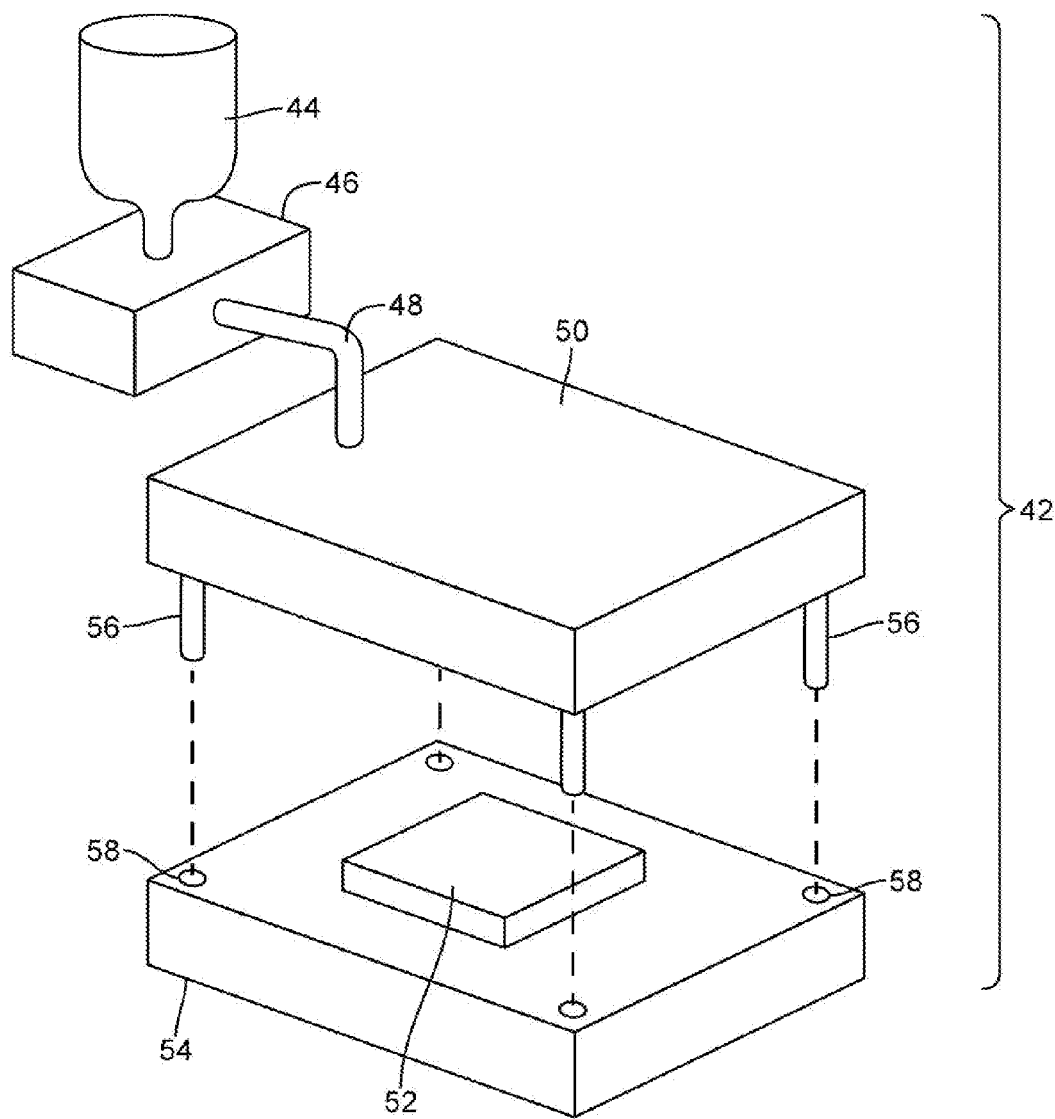
FIG. 3 is an exploded perspective view of a molding tool that may be used in forming a display trim for an electronic device display in accordance with an embodiment.

Trim 24 may be formed using an injection molding tool such as tool 42 in the perspective view of FIG. 3. Tool 44 may have a reservoir for plastic pellets or other plastic material such as reservoir 44. The plastic may be, for example, a thermoplastic elastomer (TPE) such as a thermoplastic polyurethane, a thermoplastic polyamide, or other thermoplastic elastomer. Reservoir 44 may be used to provide the plastic pellets to heater 46 for melting. Heater 46 may raise the temperature of the plastic pellets above their melting temperature (e.g., to a temperature of greater than 250° C.). Melted plastic may be forced into channels within a plastic molding structure such as upper die 50 through tubing 48 (as an example).

Upper die 50 may mate with lower die 54. Plastic injection molding die structures such as upper die 50 and lower die 54 may be provided with alignment features such as illustrative pins 56 and mating openings 58 to help align portions of the die structures to each other and to workpiece 52. For example, pins 56 may be used to help align upper die 50 with lower die 54.

During injection molding operation, a workpiece such as workpiece 52 may be received within the die. For example, workpiece 52 may be received within a cavity in the interior of upper die 50 and/or lower die 54, when die 50 and die 54 are joined. Workpiece 52 may be, for example, housing 12. Upper die 50 and lower die 54 may press against the surfaces of workpiece 52 (i.e., housing 12) to hold workpiece 52 in place during injection molding operations. As heated molten plastic from reservoir 44 flows into the die, trim 24 can be formed directly on housing 12. This may help trim 24 attach to housing 12 (e.g., by forming chemical bonds). The molding die may be maintained at a relatively low temperature relative to the temperature of heater 46 to help cool the plastic that forms trim 24. For example, the molding die structures may be maintained at a temperature of about 30° C.

Figure 4:
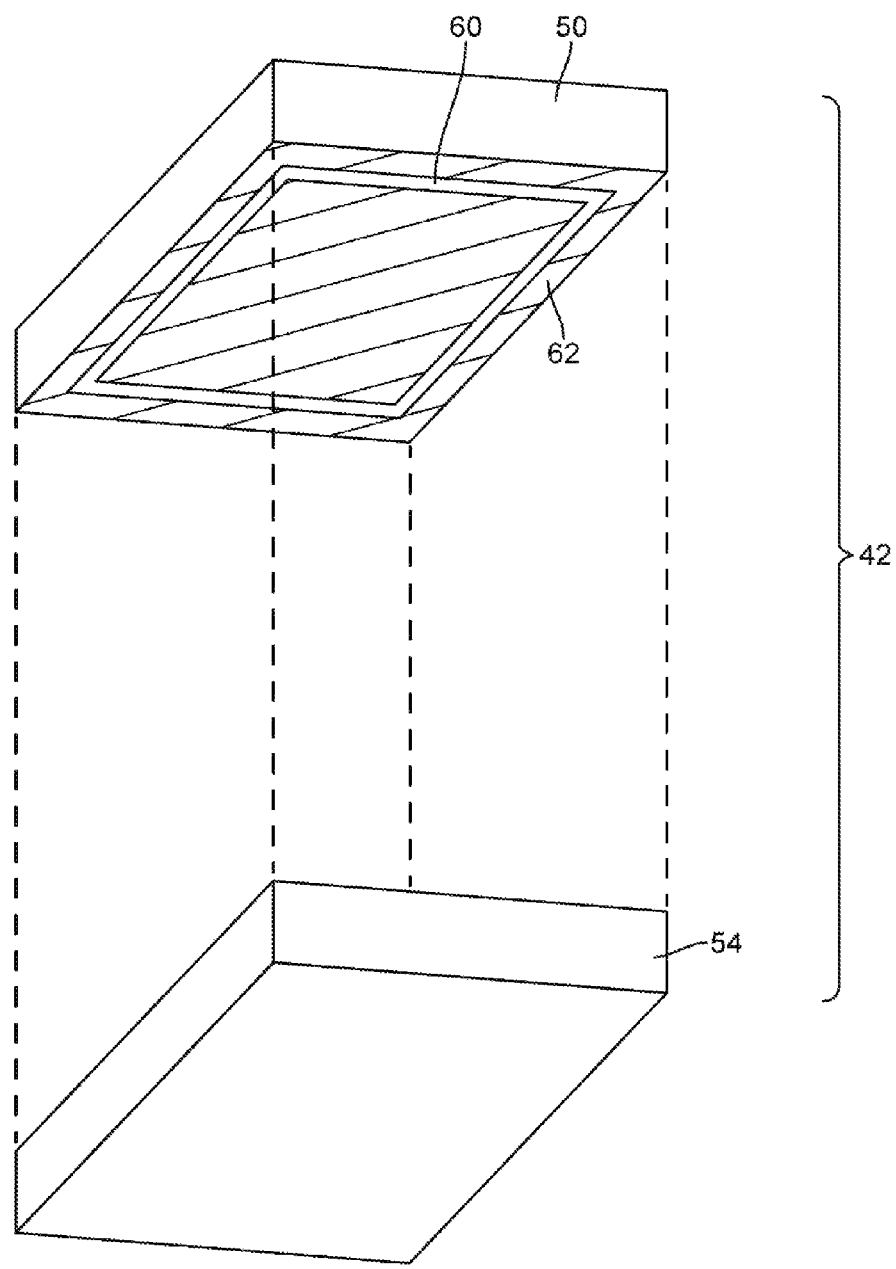
FIG. 4 is a perspective view of upper and lower molding dies in an illustrative molding tool having a groove in the upper die for forming an injection molded display on an electronic device housing in accordance with an embodiment.

FIG. 4 is a perspective view of an illustrative set of die structures for injection molding tool 42 of FIG. 4. Tool 42 may have mating upper and lower injection molding die such as upper die 50 and lower die 54. Die 50 may be formed from one or more metal members and die 54 may be formed from one or more metal members. If desired, separate sections of each die may be independently positioned using computer-controlled positioners.

The metal members or other structures that form the die 50 and die 54 may be pressed against the surfaces of housing 12 or other workpiece using computer-controlled positioners (actuators) to form seals that restrain the flow of molten plastic during injection molding. As shown in the example of FIG. 4, lower surface 62 of upper die 50 may be provided with a channel such as channel 60. Channel 60 may have the shape of a rectangular ring-shaped groove that matches the rectangular shape of the periphery of housing 12. Molten plastic may flow in channel 60 during molding.

Figure 5:
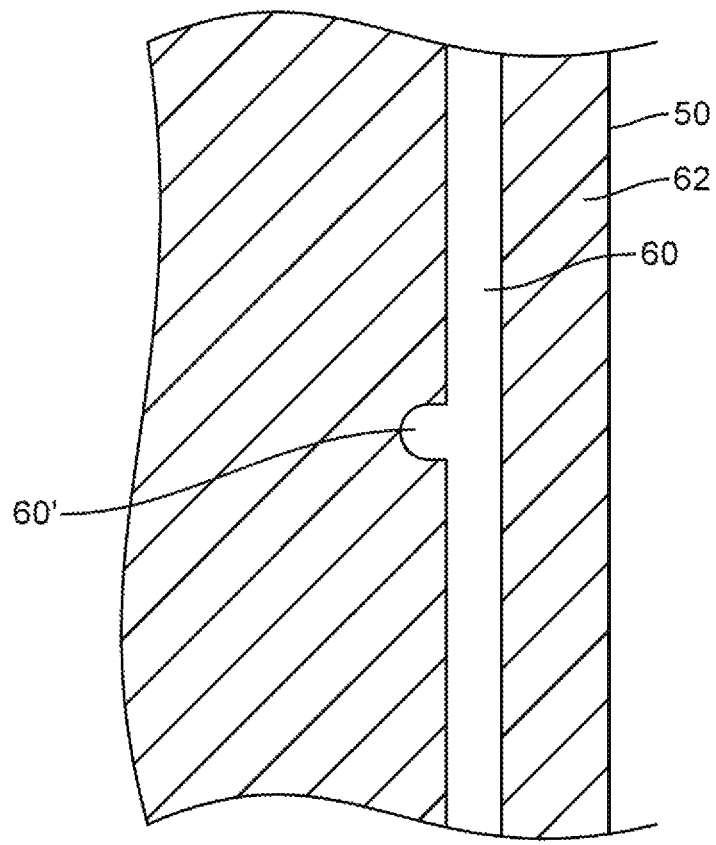
FIG. 5 is a top view of a portion of a molding die having a channel with a recess for accommodating injected molded plastic for a display trim on an electronic device housing in accordance with an embodiment.

During injection molding operations, a thermoplastic elastomer or other injection molded plastic in channel 60 may be used to form an injection molded plastic trim such as trim 24 on housing 12. FIG. 5 is a top view of a portion of trim channel 60 of FIG. 4 in upper die 50 showing how channel 60 may have a locally enlarged portion such as locally enlarged portion 60' to accommodate injection of molded plastic when forming trim 24. Rectangular ring-shaped channel 60 in die 50 may be provided with one or more locally enlarged portions such as locally enlarged portion 60' (e.g., one or more locally enlarged portions 60', two or more locally enlarged portions 60', etc.).

Figure 6:
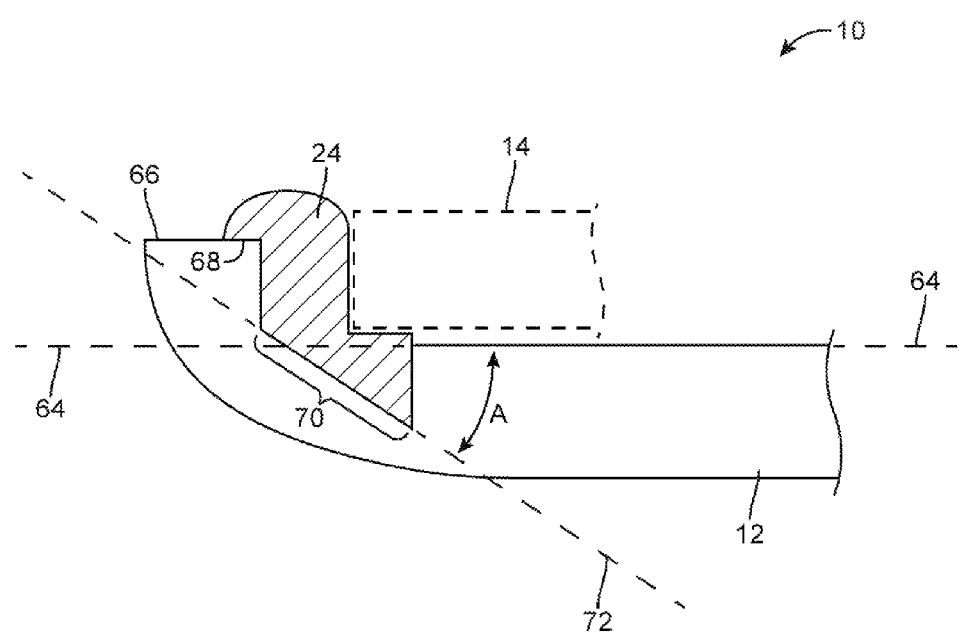
FIG. 6 is a cross-sectional side view of a portion of an electronic device housing showing how a molded display trim may have an angled lower surface in accordance with an embodiment.

FIG. 6 is a cross-sectional side view of a portion of device 10 in a configuration in which trim 24 and housing 12 have been provided with mating angled surface 70 on the inner surface of housing 12. Housing 12 may have a planar shape that runs parallel to horizontal axis 64 (in the orientation of FIG. 6). In this configuration, the planar shape of housing 12 may lie in a horizontal plane.

Diagonal axis 72 may be oriented at a non-zero angle A with respect to horizontal axis 64 and the horizontal plane of housing 12. A portion of the inner edge of housing 12 (i.e., a rectangular edge running around the rectangular periphery of housing 12 in region 70) may lie in a plane that runs along angled axis 72. Trim 24 may likewise have an angled edge in region 70. As a result, inner surface 70 of housing 12 will be angled at a non-zero angle with respect to the horizontal plane containing housing 12 and will be angled at a non-zero axis with respect to horizontal axis 64.

The length of region 70 along axis 72 will be longer than the length of a horizontally oriented lower surface on trim 24, so an angled lower surface configuration for trim 24 of the type shown in FIG. 6 may help increase surface area in contact region 70 between trim 24 and housing 12. The enhanced surface area in region 70 that is afforded by the non-zero angle A of axis 72 may create a large bonding surface that helps attach trim 24 securely to housing 12. Trim 24 may also have an upper lip portion that extends over inner edge 68 of upper housing edge surface 66 to help attach molded trim 24 to housing 12.

Figure 7:
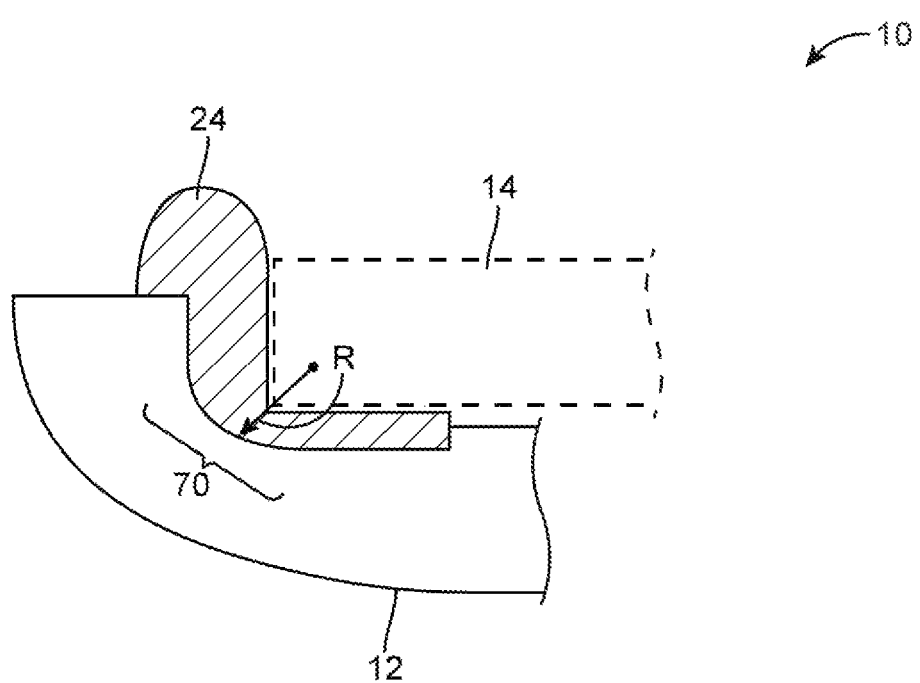
FIG. 7 is a cross-sectional side view of a portion of an electronic device showing how a molded display trim may have a curved portion that is characterized by a radius of curvature in accordance with an embodiment.

In the illustrative configuration of FIG. 7, region 70 of trim 24 and housing 12 is characterized by a smooth curved shape having a radius of curvature R that is greater than a minimum radius of curvature Rmin and that is less than a maximum radius of curvature Rmax. Minimum radius of curvature Rmin may be, for example, 10 mm, 5 mm, 1 mm, 0.5 mm, 0.1 mm, less than 0.1 mm, or other suitable size. Maximum radius of curvature Rmax may be 0.1 mm, 0.5 mm, 1 mm, 5 mm, 10 mm, greater than 10 mm, or other suitable size. By ensuring that the radius of curvature R is not too small, stresses in trim 24 can be minimized. Radius of curvature R is preferably not too large, so that the right angle bend between the vertical and horizontal portions of the inner surface of housing 12 can be formed compactly.

Figure 8:
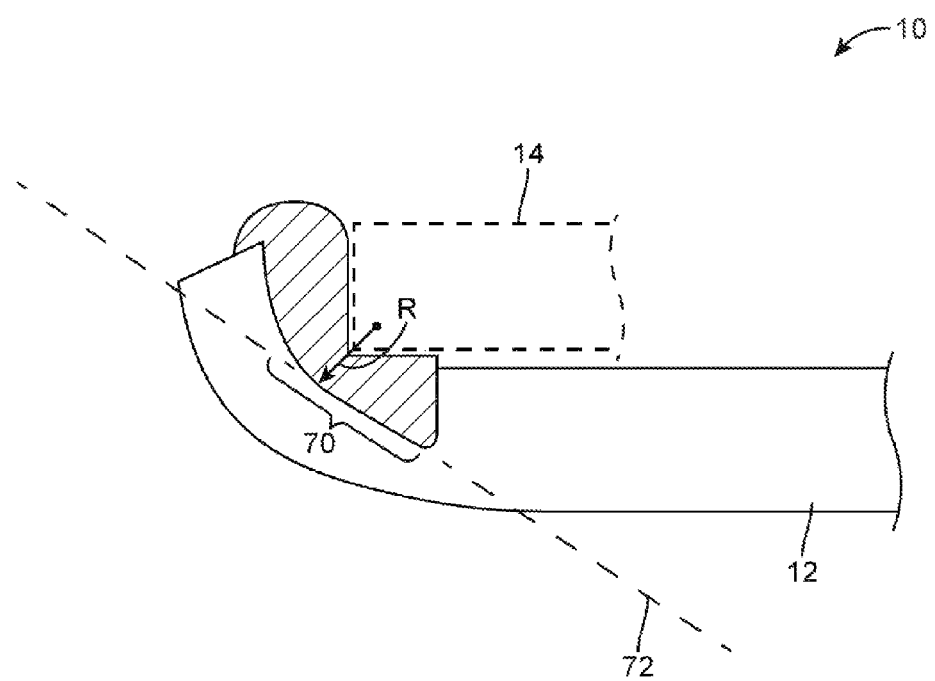
FIG. 8 is cross-sectional side view of a portion of an electronic device showing how an illustrative molded display trim may have an angled lower surface and a curved portion that is characterized by a radius of curvature in accordance with an embodiment.

FIG. 8 shows how region 70 of trim 24 and housing 12 may be provided with a radius of curvature R that is between Rmin and Rmax while also orienting an extending part of region 70 along angled axis 72. Other configurations may be used for housing 12 and trim 24 if desired. The arrangements shown in FIGS. 6, 7, and 8 are merely illustrative.

Figure 9:
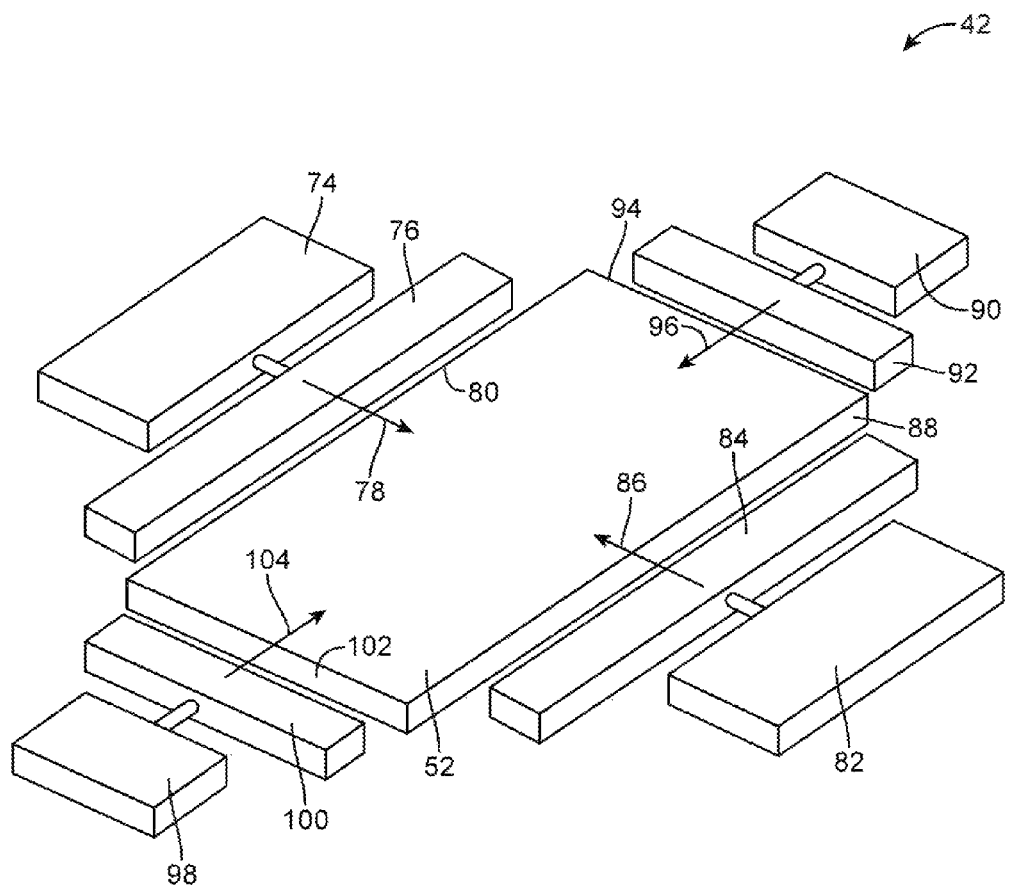
FIG. 9 is a perspective view of two pairs of lateral actuators that are associated with an illustrative injection molding tool for forming a molded display trim for a display in accordance with an embodiment.

FIG. 9 is a perspective view of portions of injection molding tool 42. As shown in FIG. 9, injection molding tool 42 may use computer-controlled positioners (actuators) to help control the lateral position of workpiece 52 (e.g., housing 12) relative to upper die 50 and lower die 54 (not shown in FIG. 9). For example, computer-controlled positioner 74 may use sliding member 76 to press against edge 80 of workpiece 52 in direction 78 and opposing computer-controlled positioner 82 may use sliding member 84 to press against edge 88 of workpiece 52 in direction 86. Computer-controlled positioner 98 may use sliding member 100 to bear against surface 102 of workpiece 52 in direction 104 and opposing computer-controlled positioner 90 may use sliding structure 92 to press against edge 94 of workpiece 52 in direction 96. More positioners or fewer positioners may be used in injection molding tool 42 if desired. For example, vertical positioners may be used at each of the four corners of workpiece 52, combinations of vertical and horizontal (lateral) positioners may be used to adjust the position of workpiece 52, etc. The configuration of FIG. 9 in which two sets of opposing pairs of lateral positioners are used to adjust the lateral position of workpiece 52 is merely illustrative.

Figure 10:
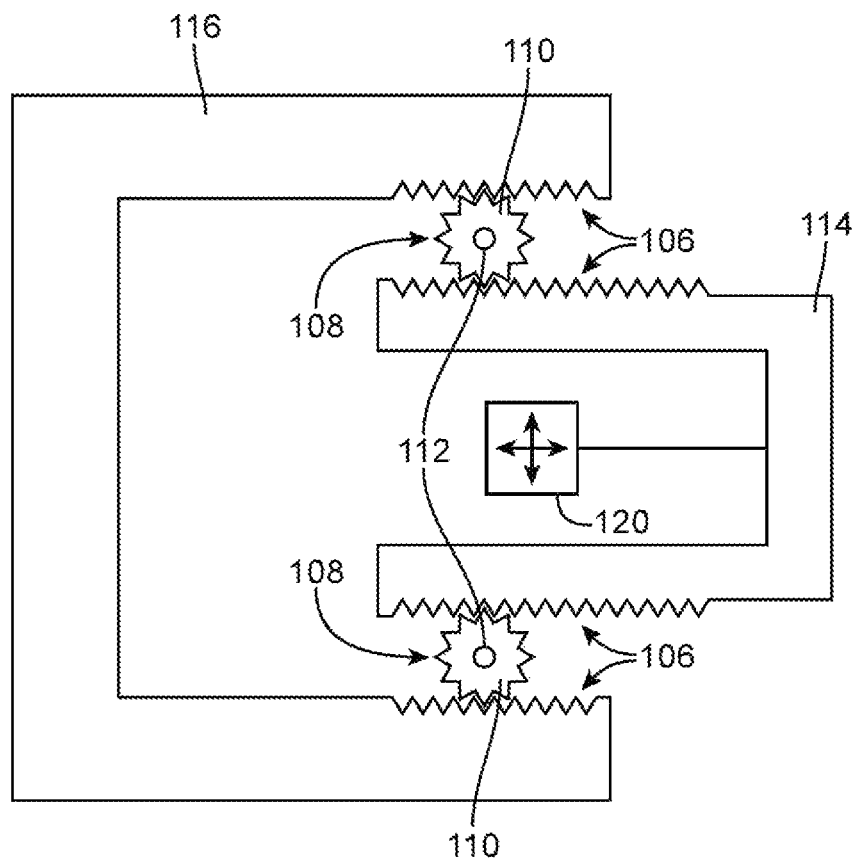
FIG. 10 is a cross-sectional side view of an illustrative geared actuator that may be used in moving molding tool structures during the process of insert molding a display trim for a display in accordance with an embodiment.

FIG. 10 is a diagram showing how positioners in injection molding tool 42 may have geared surfaces such as straight geared surfaces 106 on members 114 and 116 and curved geared surfaces 108 on gears 110. Gears 110 may rotate around axes 112. Motors attached to gears 110 or a linear actuator such as linear actuator 120 may be used in moving member 114 relative to member 116, thereby moving sliding members or other structures in injection molding tool 42 against workpiece 52 (see, e.g., FIG. 9).

Figure 11:
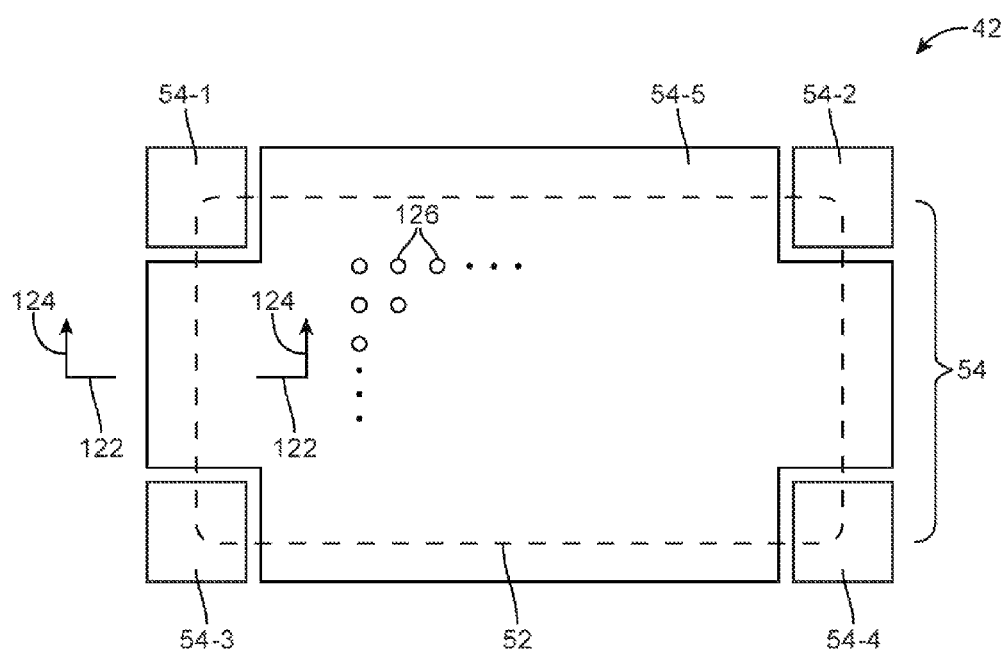
FIG. 11 is a top view of an illustrative display trim molding tool in accordance with an embodiment.

Housing 12 may have the shape of a rectangular box or other suitable shape. For example, housing 12 may have a rectangular box shape with curved corners, one or more curved edges, or other shapes. FIG. 11 is a top view of injection molding equipment 42 showing how injection molding tool 42 may have a segmented lower die. As shown in FIG. 11, lower die 54 may have a central die portion 54-5 that has vacuum holes for holding workpiece 52 (housing 12) in place on central die portion 54-5. Lower die 54 may also have four corner portions 54-1, 54-2, 54-3, and 54-4. The vertical position (into and out of the page in the orientation of FIG. 11) of each of the portions of die 54 may be controlled independently to help ensure that the surfaces of lower die 54 conform to the exterior shape of housing 12. In configurations in which housing 12 has curved exterior surfaces, lower die sections 54-1, 54-2, 54-3, 54-4, and 54-5 may have mating curved surfaces that match the curved surfaces of the exterior of housing 12. This allows lower die 54 to place pressure vertically upward on the lower surfaces of housing 12 while avoiding any damage to housing 12 (i.e., workpiece 52) as upper die 50 applies pressure vertically downward to form a seal when injection molding plastic for trim 24.

Figure 12:
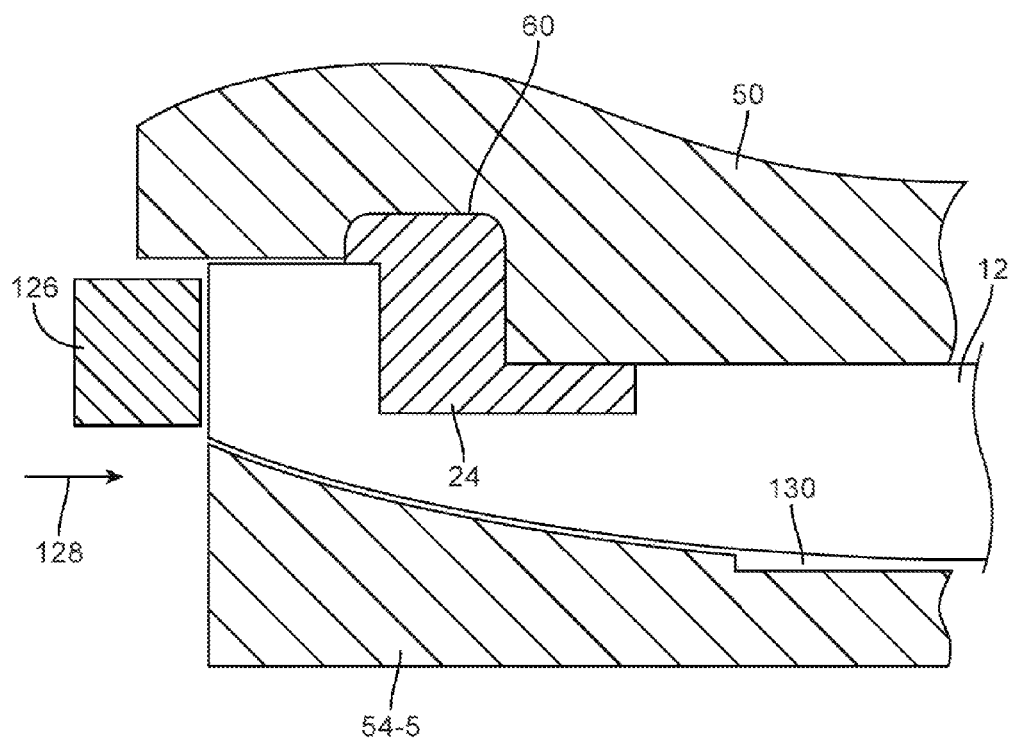
FIG. 12 is a cross-sectional side view of an edge portion of the illustrative display trim molding tool of FIG. 11 in accordance with an embodiment.

A cross-sectional side view of an edge portion of tool 42 of FIG. 11 taken along line 122 and viewed in direction 124 is shown in FIG. 12. As shown in FIG. 12, lower die portion 54-5 may have a central recess that forms a rectangular gap such as gap 130 under the center of housing 12. Gap 130 may provide clearance between the central upper surface of lower die 54 and the outer surface of housing 12 to avoid damaging housing 12. The upper surface of die portion 54-5 along the edge of housing 12 may have a curved shape that matches the curved shape of the exterior of housing 12. Lateral positioners such as positioner 126 may be used to adjust the lateral position of housing 12 relative to lower die 54 and upper die 50. For example, lateral positioner 126 may press against the left edge of housing 12 in direction 128 and three other lateral positioners may press against three other edges of housing 12 to allow housing 12 to be centered or otherwise positioned within tool 42. Machine vision or other sensing techniques may be used to provide positioners in injection molding tool 42 with information on the position of dies 50 and 54 and workpiece 52.

Upper die 50 may have a channel such as channel 60. During injection molding operations, molten plastic may be injected into channel 60 to form trim 24. As part of the injection molding process, trim 24 may form chemical bonds with mating surfaces of housing 12. Trim 24 may also be formed with a small size that satisfies desired tight tolerances due to the use of injection molding techniques to form trim 24 directly on housing 12 while aligning housing 12 relative to the die with computer-controlled positioners.

Figure 13:
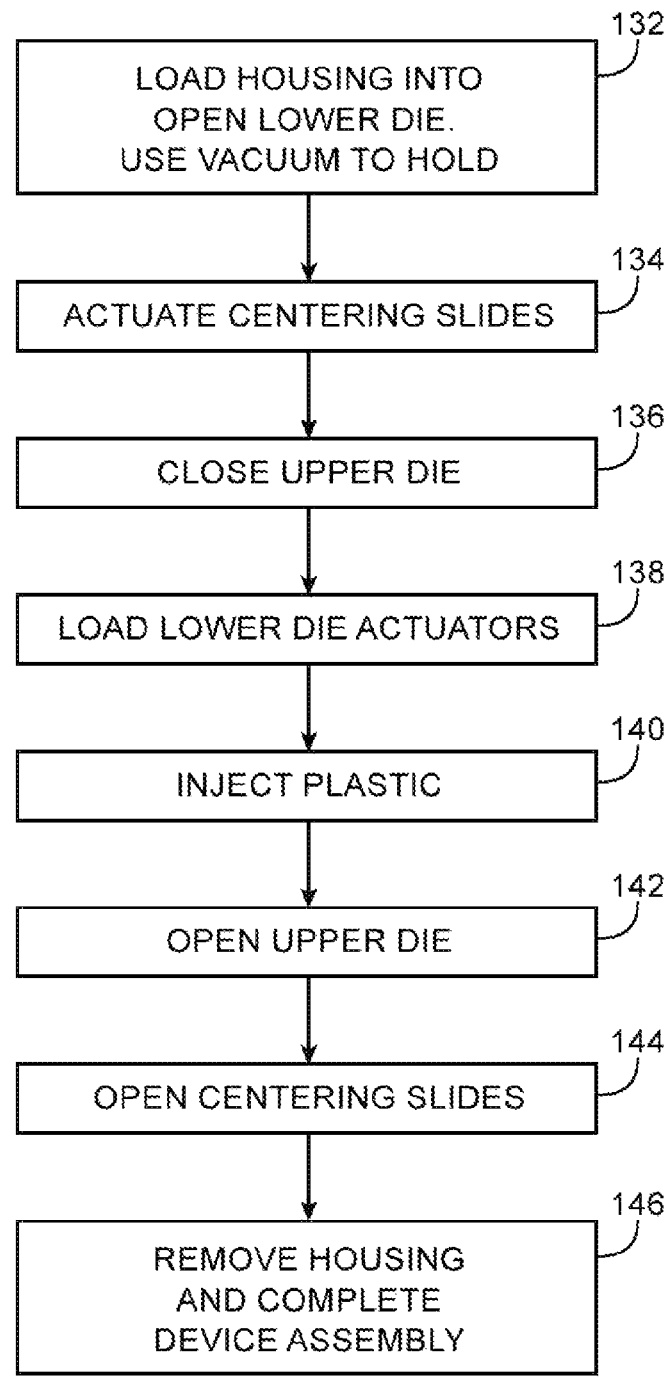
FIG. 13 is a flow chart of illustrative steps involved in forming a molded plastic display trim for an electronic device display in accordance with an embodiment.

A flow chart of illustrative steps involved in forming an electronic device with an injection molded plastic display trim is shown in FIG. 13.

At step 132, housing 12 may be located into lower die 54. Centering sliding members such as computer-controlled sliding members 76, 92, 82, and 100 of FIG. 9 or other lateral positioners may be used to center housing 12 within tool 42, thereby laterally positioning housing 12 in an accurate location with respect to lower die 54.

At step 136, upper die 50 may be lowered on top of housing 12 and lower die 54. Alignment features such as pins 56 and holes 58 of FIG. 3 may engage with each other to align upper die 50 and channel 60 with respect to housing 12.

At step 138, lower die positioners such as independent computer-controlled vertically traveling positioners coupled to lower die portions 54-1, 54-2, 54-3, 54-4, and 54-5 may be moved vertically upwards against the lower surfaces of housing 12 to load the lower die and thereby press the upper and lower dies together to form a seal with housing 12.

At step 140, molten plastic from heater 46 may be injected into channel 60 in upper die 50, thereby overmolding trim 24 onto housing 12. Trim 24 may have a rectangular ring shape or may have other suitable shapes (e.g., trim 24 may be divided into multiple trim segments, trim 24 may have straight and/or curved trim sections, etc.).

At step 142, upper die 50 may be removed from housing 12.

The lateral positioners of tool 42 (see, e.g., FIG. 9) may be released by moving them horizontally outward at step 144.

At step 146, housing 12 and integrally molded trim 24 may be removed from injection molding tool 24. Trim 24 is attached to housing 12 and surrounds a rectangular opening having dimensions matching the exterior lateral dimensions of display 14. Display 14 may be mounted in the rectangular opening in the center of trim 24 and display 14 (e.g., using a press fit, using adhesive, without using adhesive, and/or using other assembly techniques). Housing 12, display 14, and other components such as components 36 and substrate 34 of FIG. 2 may be assembled together to form a completed electronic device.

The foregoing is merely illustrative and various modifications can be made by those skilled in the art without departing from the scope and spirit of the described embodiments. The foregoing embodiments may be implemented individually or in any combination.

What is claimed is:

1. A method of forming an electronic device, comprising:
   injection molding a plastic display trim having an opening onto an electronic device housing structure for the electronic device using an injection molding tool; and
   after injection molding the plastic display trim, mounting a display in the plastic display trim by placing the display in the opening.

2. The method defined in claim 1 wherein injection molding the plastic display trim comprises melting thermoplastic elastomer material to form plastic for the plastic display trim.

3. The method defined in claim 2 wherein the injection molding tool comprises a die with a rectangular channel and wherein injection molding the plastic display trim comprises injecting the plastic into the rectangular channel.

4. The method defined in claim 3 wherein the electronic device housing lies in a plane and has an angled inner surface that is angled at a non-zero angle with respect to the plane and wherein injection molding the plastic display trim comprises injection molding the plastic display trim over the angled inner surface.

5. The method defined in claim 3 wherein the electronic device housing structure has a curved surface with a radius of curvature and wherein injection molding the plastic display trim comprises injection molding the plastic display trim over the curved surface.

6. The method defined in claim 5 wherein the radius of curvature is more than 0.1 mm and is less than 5 mm.

7. The method defined in claim 1 wherein the injection molding tool has upper die structures and lower die structures, the method further comprising:
   pressing the electronic device housing structure between the upper die structures and the lower die structures.

8. The method defined in claim 7 further comprising:
   laterally positioning the electronic device housing structure relative to the lower die structures using computer-controlled positioners.

9. The method defined in claim 8 wherein the lower die structures include a plurality of individually controlled sections, and wherein pressing the electronic device housing structure between the upper die structures and the lower die structures comprises moving each of the individually controlled sections against the electronic device housing structure.

10. The method defined in claim 9 wherein the individually controlled sections comprise four corner sections and wherein pressing the electronic device housing structure between the upper and lower die structures comprises moving each of the four corner sections.

11. Apparatus, comprising:
an electronic device housing having a ledge;
an overmolded plastic display trim that is injection molded onto the electronic device housing; and
a display within the plastic display trim, wherein the display has opposing inner and outer surfaces, wherein light is emitted through the outer surface, and wherein a portion of the plastic display trim is interposed between the inner surface of the display and the ledge of the electronic device housing.

12. The apparatus defined in claim 11 wherein the display comprises a rectangular display cover glass mounted within the plastic display trim.

13. The apparatus defined in claim 12 wherein the electronic device housing comprises a planar metal housing and wherein the overmolded plastic display trim is injection molded onto an inner surface of a peripheral portion of the planar metal housing.

14. The apparatus defined in claim 11 wherein the overmolded plastic display trim has a rectangular ring shape with a rectangular opening in which the display is mounted.

15. The apparatus defined in claim 14 wherein the electronic device housing lies in a plane and wherein an angled interior surface of the housing lies along an axis that is oriented at a non-zero angle with respect to the plane and wherein the overmolded plastic display trim is injection molded onto the angled interior surface.

16. The apparatus defined in claim 14 wherein the electronic device housing lies in a plane and wherein a curved interior surface of the electronic device housing is characterized by a radius of curvature of more than 0.1 mm and less than 5 mm and wherein the overmolded plastic display trim is injection molded onto the curved interior surface.

17. The apparatus defined in claim 14 further comprising:
a printed circuit; and
electrical components mounted on the printed circuit, wherein the printed circuit and the electrical components are located between the electronic device housing and the display.

18. Apparatus, comprising:
a metal computing device housing structure;
a plastic trim molded directly onto the metal computing device housing structure, wherein the metal computing device housing structure has a curved surface and wherein the plastic trim conforms to the curved surface; and
a display layer mounted within the plastic trim, wherein the display layer comprises opposing inner and outer surfaces joined by a side surface, wherein the curved surface of the metal computing device housing structure extends from a first portion that is parallel to the side surface of the display layer to a second portion that is parallel to the inner surface of the display layer.

19. The apparatus defined in claim 18 wherein the display layer comprises a rectangular glass layer.

* * * * *